US007010390B2

(12) United States Patent
Graf et al.

(10) Patent No.: US 7,010,390 B2
(45) Date of Patent: Mar. 7, 2006

(54) METHOD AND SYSTEM FOR CONTROLLING ROBOTS

(75) Inventors: Stefan Graf, Zusamaltheim (DE); Andreas Hagenauer, Friedberg (DE); Michael Chaffee, Gaines, MI (US)

(73) Assignee: KUKA Roboter GmbH, Augsburg (DE)

( * ) Notice: Subject to any disclaimer, the term of this patent is extended or adjusted under 35 U.S.C. 154(b) by 174 days.

(21) Appl. No.: 10/623,300

(22) Filed: Jul. 17, 2003

(65) Prior Publication Data

US 2005/0027394 A1    Feb. 3, 2005

(51) Int. Cl.
*G06F 19/00*   (2006.01)
(52) U.S. Cl. ............ 700/245; 700/246; 700/247; 700/248; 700/249; 700/250; 700/251; 700/258; 901/6; 901/9; 901/46; 318/568.1; 701/23
(58) Field of Classification Search ........ 700/245–251, 700/258, 254, 264, 23; 318/568.1; 901/6, 901/9, 46
See application file for complete search history.

(56) References Cited

U.S. PATENT DOCUMENTS 6,330,493 B1 *  12/2001  Takahashi et al. .......... 700/245

OTHER PUBLICATIONS

Huang et al., Construction adn soccer dynamics analysis of an integrated multi-agent soccer robot system, 2001, Internet, pp. 84-93.*
Lee et al., A robot in intelligent environment: Soccer robot, 1999, IEEE, 73-78.*
Farinelly et al., Cognitive Soccer robots, 2003, Internet, pp. 1-2.*
Trivedi, Soccer robots compete for 6th annual robocup, 2002, Internet pp. 1-4.*

* cited by examiner

*Primary Examiner*—Thomas G. Black
*Assistant Examiner*—McDieunel Marc
(74) *Attorney, Agent, or Firm*—McGlew and Tuttle, PC

(57) ABSTRACT

The invention concerns a method and a system for controlling a first robot and at least one other robot, the at least one other robot being calibrated relative to the first robot by the determination of at least one coordinate transformation of the first robot relative to at least one other robot and said at least one transformation is stored in a control device of the other robot, wherein also the first robot is calibrated relative to the other robot by the determination of at least one independent coordinate transformation and said at least one independent transformation is stored in a control device of the first robot.

20 Claims, 8 Drawing Sheets

METHOD AND SYSTEM FOR CONTROLLING ROBOTS

The invention relates to a method for controlling a first robot and at least one other robot, the at least one other robot is calibrated relative to the first robot by determining a coordinate transformation of the first robot relative to the other robot and said transformation is stored in a control device of the other robot, as well as a system for controlling a first robot and at least one other robot with a device for calibrating at least one other robot relative to the first robot by determining a coordinate transformation of the first robot relative to the other robot and with a memory means in the control device of the other robot for storing this transformation.

U.S. Pat. No. 6,330,493 B1 relates to the coordinated or cooperative operation of a plurality of robots. In such an operation one of the robots functions as master robot and the other as slave robots. For this purpose, by calibration, a transformation matrix between the robots is determined, in that e.g. in the world coordinate system of a first robot the position of another robot is determined. According to this document the transformation determining the position of the first robot in the world coordinate system of the second robot is the inverted, first-mentioned transformation, so that the transformation only has to be determined once, e.g. that of the other robot in the system of the first robot and the inverted transformation can be used for determining the first robot in the system of the second robot, without a further determination being necessary. This academic approach implies in the same way that in the case of three robots the third robot only has to be determined in the coordinate system of one of the two robots, e.g. the second robot and all the other coordinate transformations can be obtained mathematically from the determined one.

As a result of robot kinematics this academic approach is incorrect, because the transformation of one robot relative to another cannot be simply inverted in order to determine a precise transformation of the other robot relative to the first robot. This more particularly applies when operating robots under a load, because there is then a significant deflection of up to 10 mm in the case of certain robots and this is also dependent on the location of a robot within the working area.

In addition, the calibration of a robot in the system of another robot normally takes place in such a way that the robots move to up to three positions in the area not located on a line and the positions are determined in the given coordinate systems of the robots and subsequently from the three position data the transformation of one robot relative to the other is calculated.

If for calibration purposes use is made of a fourth position of each robot, then an overdetermination occurs, as a result of which by iterative optimization the roots of the sum of the squares (L2 standardization) of the given 12 vector (3 coordinates of 4 points) implying the difference between the locations of the components of the coordinate system of one robot and the transformed coordinate components of the four points of the other robot is minimized. This gives a nonlinear equation with several minima. Thus, the robots can find different local minima, so that in this case the transformation are from a first robot to another is not necessarily the inverse of the transformation from the other robot to the first.

The problem of the invention is to provide a method and a system by means of which the control of cooperating robots is improved and can be optimized for all the partial regions of their common operating areas.

According to the invention this problem is solved by a method of the aforementioned type, which is further on characterized in that also the first robot is calibrated relative to the other robot by the determination of at least one independent coordinate transformation and said at least one independent transformation is stored in a control device of the first robot. For solving the said problem the invention also provides a system for controlling robots, having a determination device for calibrating the first robot relative to the other robot by the determination of at least one independent coordinate transformation of at least one other robot relative to the first robot and by a memory device in a control device of the first robot for storing at least one independent transformation.

According to a preferred variant of the invention, in the case of at least three robots, each robot is calibrated relative to the others by at least one independent determination of coordinate transformations and the at least one transformation of the calibration of each robot is stored in a control device thereof or that in the case of at least three robots, each of the robots has in its control device a means for the calibration thereof relative to each of the other robots by determining at least one coordinate transformation with respect to each of the other robots, as well as a memory means for storing the in each case at least one coordinate transformation.

In a preferred development of the method according to the invention, for each robot several calibrations are performed each at different positions, and the thus obtained transformations are stored. This implies that the calibration of one robot relative to the other robot takes place at another, different position to the calibration of the other robot relative to the first robot. This also implies that for different positions and therefore different operating regions in each case individual calibrations or determinations of the coordinate transformations can be performed for each robot.

In a further preferred development of the inventive method, in the case of cooperating operation of at least two robots, the coordinates of the independent robot and the coordinates transformed relative thereto of the independent robot or robots are used and in particular in operating area-dependent manner the coordinates of one robot and the coordinates transformed relative thereto of one or more other robots are used. Whereas in principle both systems in the coordinate system of the independent robot and consequently the independent robot or robots operate in the transformed coordinate system obtained from the coordinate system of the independent robot, in operating area-dependent manner it is also possible despite maintaining the feature as an independent robot, such an independently operating robot can operate with the coordinate system obtained from the transformation of the coordinate system of a dependently operating robot and the corresponding dependently operating robot operates in its original coordinate system—as well as optionally further dependently operating robots in their transformed coordinate system obtained from the original coordinate system of the one dependent robot.

In a further preferred development of the method according to the invention, in the case of cooperating operation of at least two robots, as desired, one of the robots can be used as an independent robot and the at least one other robot as a dependent robot and in particular during an operating process the characteristic of the robots as independent or dependent robots is changed.

In a preferred embodiment the system according to the invention is implemented for the performance of the above-defined method variants.

The invention makes it possible in the case of cooperating operation of the robots not only to use the robot as an independent robot and also at least one other as a dependent robot, but also to use an appropriate coordinate system according to which one of the robots is the independent robot and the other is the dependent robot also dependent of operating areas, in which the position differences resulting from real technology are minimized and the use of different positions is avoided for mathematical reasons. The invention makes the following possible: When two or more robots cooperate, one robot A can be independent with another robot B dependent on robot A. In this case, robot B uses a transformation obtained by its calibration to robot A. When robot B becomes the independent and robot A is then dependent on robot B, robot A uses a transformation obtained by its calibration to robot B. One transformations are more precise because they take into account the physical area of operation where the robots cooperate. Calibration was performed in the region of cooperation.

It is also possible in the first case to operate in certain operating areas with the coordinate systems of the second robot and also the transformed system of the second robot obtained therein by the calibration of the first robot, because the thus determined positions in such partial areas are more precise than when operating in the world coordinate system of the first robot and the transformation thereof to the second robot.

The same applies for cooperative operation of more than two robots, in which each can be used as an independent robot and for specific partial areas of the cooperation of robots it is possible to assume a suitable world coordinate system of one of the cooperating robots.

Due to the fact that the calibration of each of the robots takes place relative to each other robot and is stored in the control device of the correspondingly calibrated robot, according to the invention independently determined transformations are stored, which can be different from the in each case inverted transformations.

Thus, each robot can obtain its measurements from different positions. Multiple local regions for each pair of two robots can be calibrated in each direction.

The invention is decided below with reference to embodiments in the drawing.

Each of the two cooperating robots A, B has a control device A.1 or B.1, which implies a device A.2, B.2 for calibrating one robot (A, B) in the coordinate system of the other robot (A, B) and for determining the corresponding coordinate transforms robot B.regioni.transform, robot A.regioni.transform in regions i=1,2. . . (represented in the form of continuous line arrows) and a storage device A.3, B.3 for storing the corresponding coordinate transforms robot B.regioni.transform, robot A.regioni.transform (illustrated by broken line arrows).

Figure 1:
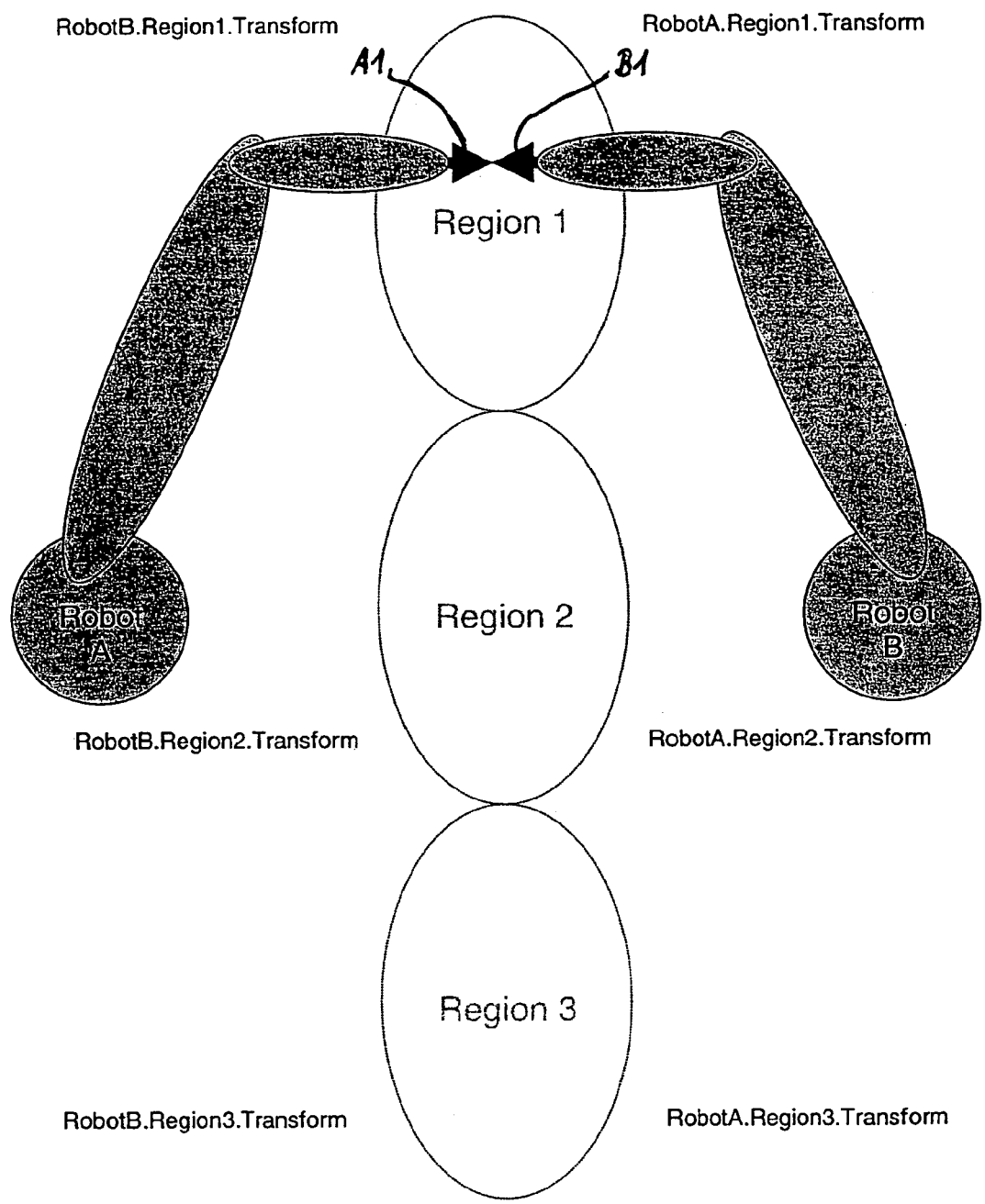
FIG. 1 shows a simple, diagrammatic representation of two cooperating robots.

In FIG. 1 point P1 represents the operating point of the tool centre point taught to the robot 2 and point P1P the same point correspondingly taught to robot 1, but which as a result of robot kinematics, loading conditions, etc., does not precisely coincide with point P1, but can instead diverge slightly therefrom.

Figure 2:
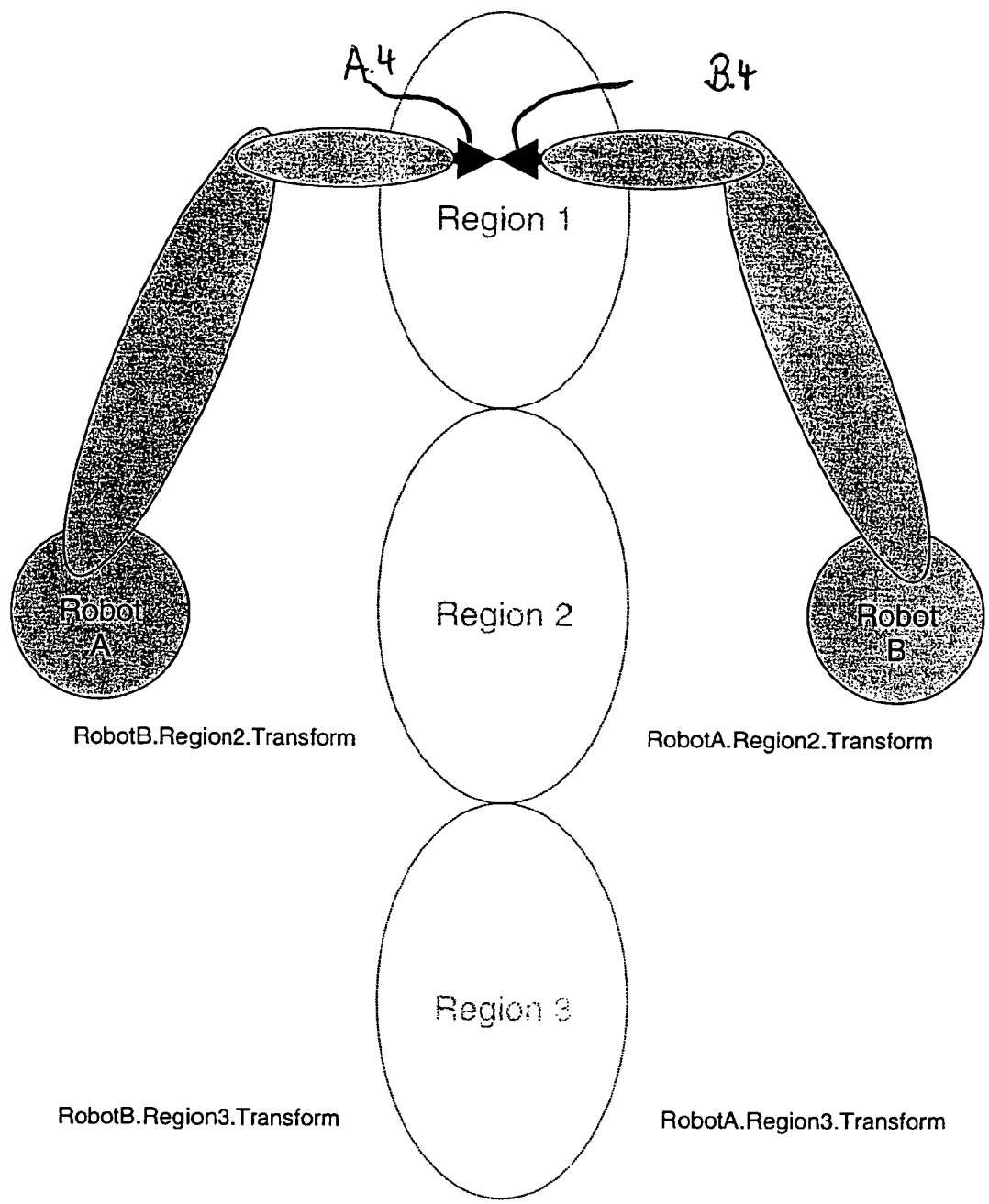
FIG. 2 shows a view of two robots to be calibrated in three regions.

FIG. 2 shows two robots, robot A and robot B, to be calibrated with regard to each other in three region s, region 1, region 2, region 3, which are local entities. Their use is specified by the program. Either robot can be dependent on the other, so each robot must be calibrated to the other once for each working region. There are a total of 6 calibrations.

Known calibration tools A.4, B.4 are mounted to the face-plates of each robot.

First robot A is calibrated to robot B in region 1. In a first step calibration is initiated from robot A. Then robot A is jogged into region 1. Robot A is jogged so that its calibration tool tip touches Robot B's calibration tool tip. The current position of Robot A is stored and the current position of Robot B is sent to Robot A. This procedure is repeated for three other positions in region 1. Standardized algorithms are employed to calculated the transform from robot A to robot B. The fourth point is used for iterative optimization. The transform is stored on the controller for robot A as robot B.region1.transform={x,y,z,a,b,c}.

Subsequently other calibrations having identical procedures for robot A to robot B in regions 2 and 3 are performed resulting in transforms robotB.region2.transform and robot B.region3.transform and for robot B to robot A in regions 1 to 3 are performed resulting in transforms robot A.region1.transform, robotA.region2.transform and robotA.region3.transform.

When robot A is calibrated to robot B in region 1 and robot B is calibrated to robot A in region 1, different calibration points can be used because each calibration is performed separately.

Figure 3:
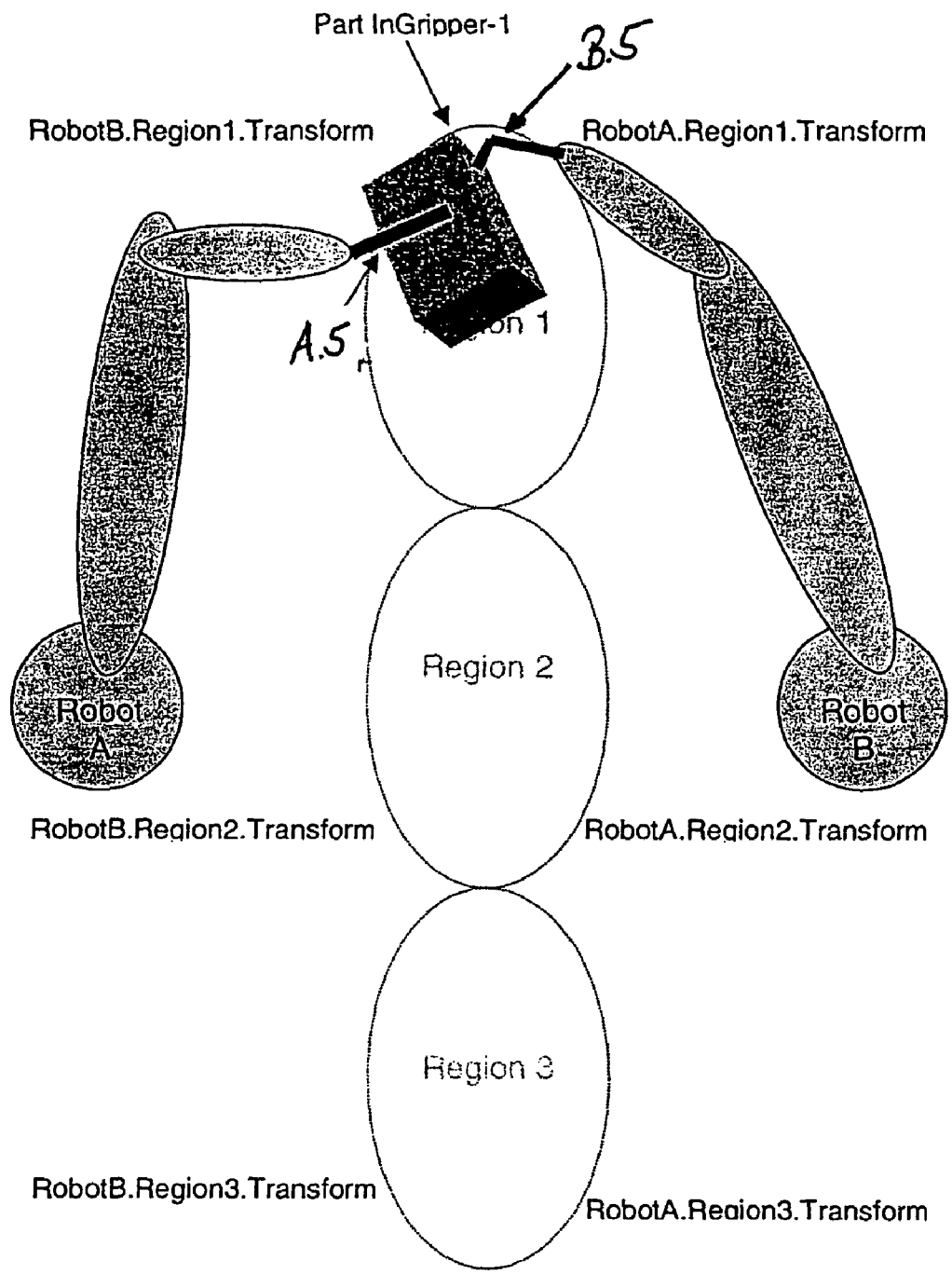
FIG. 3 to FIG. 5 shows a view of two robots handling together an object in three regions.
Figure 4:
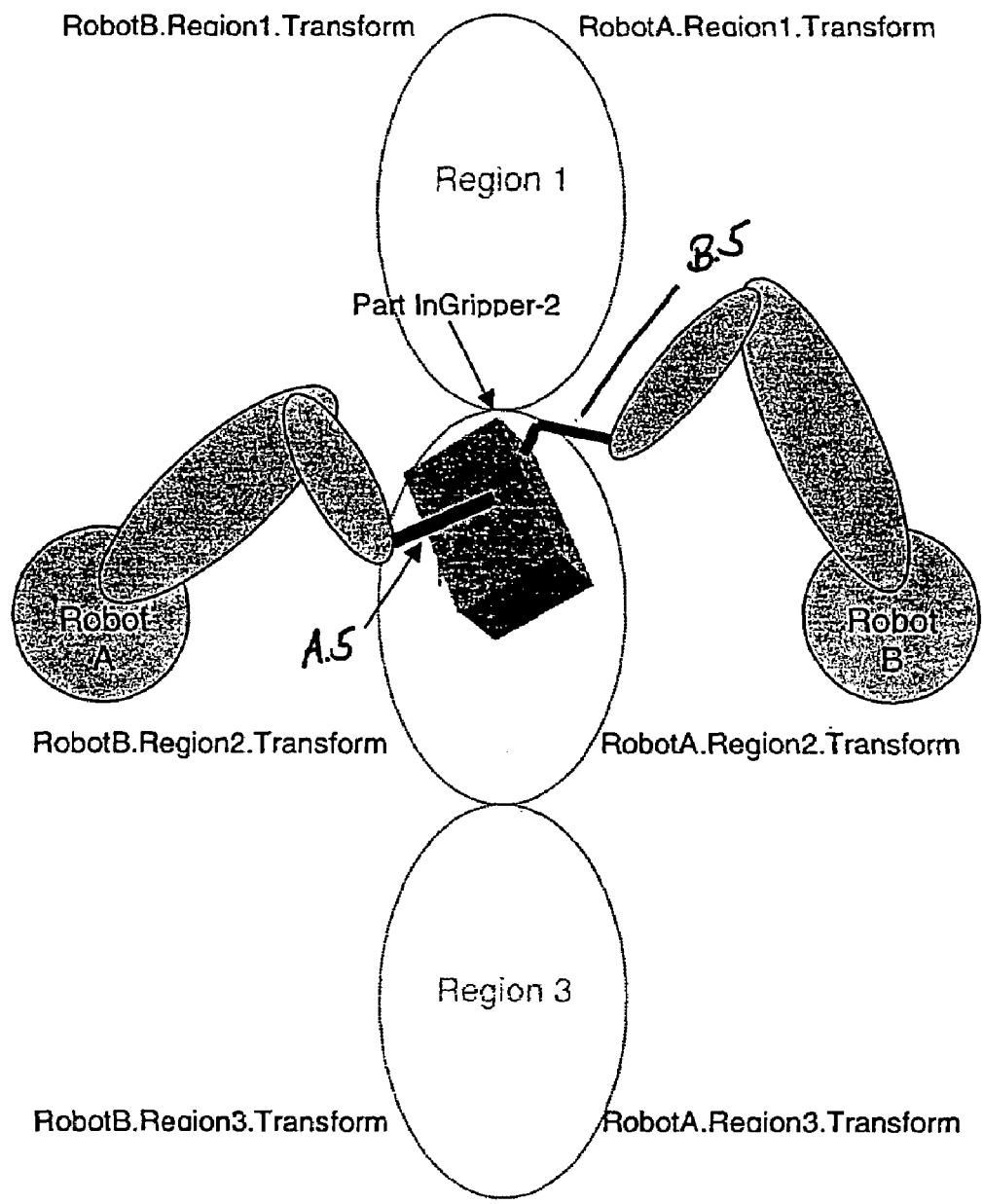
Figure 5:
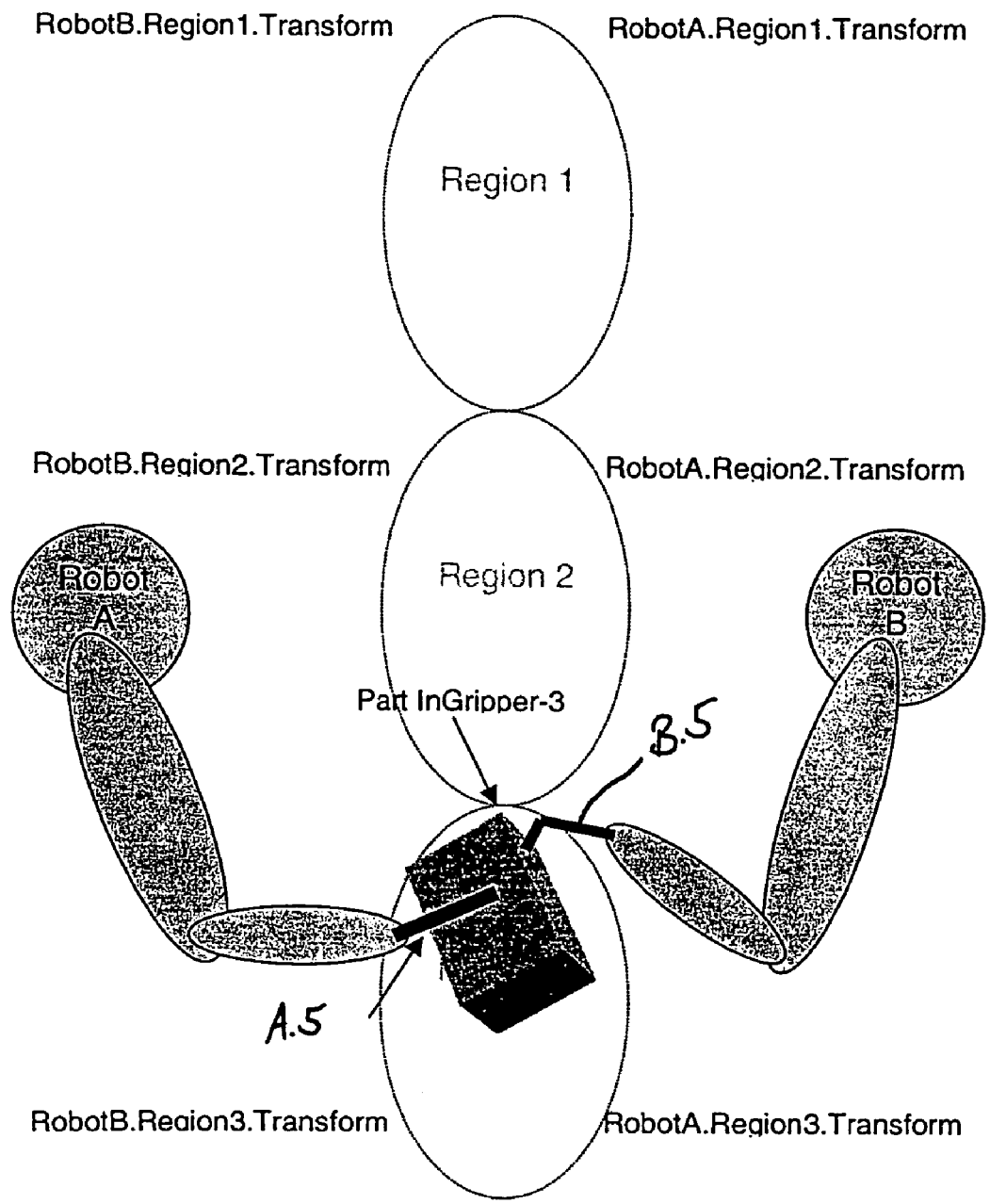

Once the robots are calibrated to each other, frames of reference relative to the opposite robot are created so that the robots can spatially cooperate or link. Here a frame is a transform. In FIG. 3, a frame PartInGripper-1 is shown. This frame represents the part as it is held in the gripper A.5 by robot A. The frame is the transform from the faceplate of the robot to a reference point on the part. The frame is defined such that its parent is robot A in region 1. This information is kept with the frame data. The gripper of the other robot B is labelled as B.5. FIG. 7 shows the same frame, but in region 2. This frame, PartInGripper-2, is actually a different frame data and is stored separately from PartInGripper-1. PartInGripper-2 is relative to robot A in region 2. FIG. 8 shows PartInGripper-3 frame relative to robot A in region 3. Positions are relative to frames. When a position is relative to a fixed frame, the position is always in the same place. When the position is relative to a frame that is relative to the faceplate of a robot, the position moves with the frame. The frame moves with the robot. You described this well in the patent application on page 9 paragraph 3.

Programmed positions are defined relative to frames. A position defined relative to the robot's world frame represents a location and orientation that are fixed with respect to the robot base. A position defined relative to any of the PartInGripper frames is relative to the position of Robot A. As the robot moves, so does the frame and the position.

The calibrations made are used with cooperting robots as follows:

Robot A starts as the independent robot and moves from region 1 to region 2 to region 3. Robot B is dependent on robot A and will follow robot A in all three regions. The programmed motion essentially specifies the region.

Figure 6A:
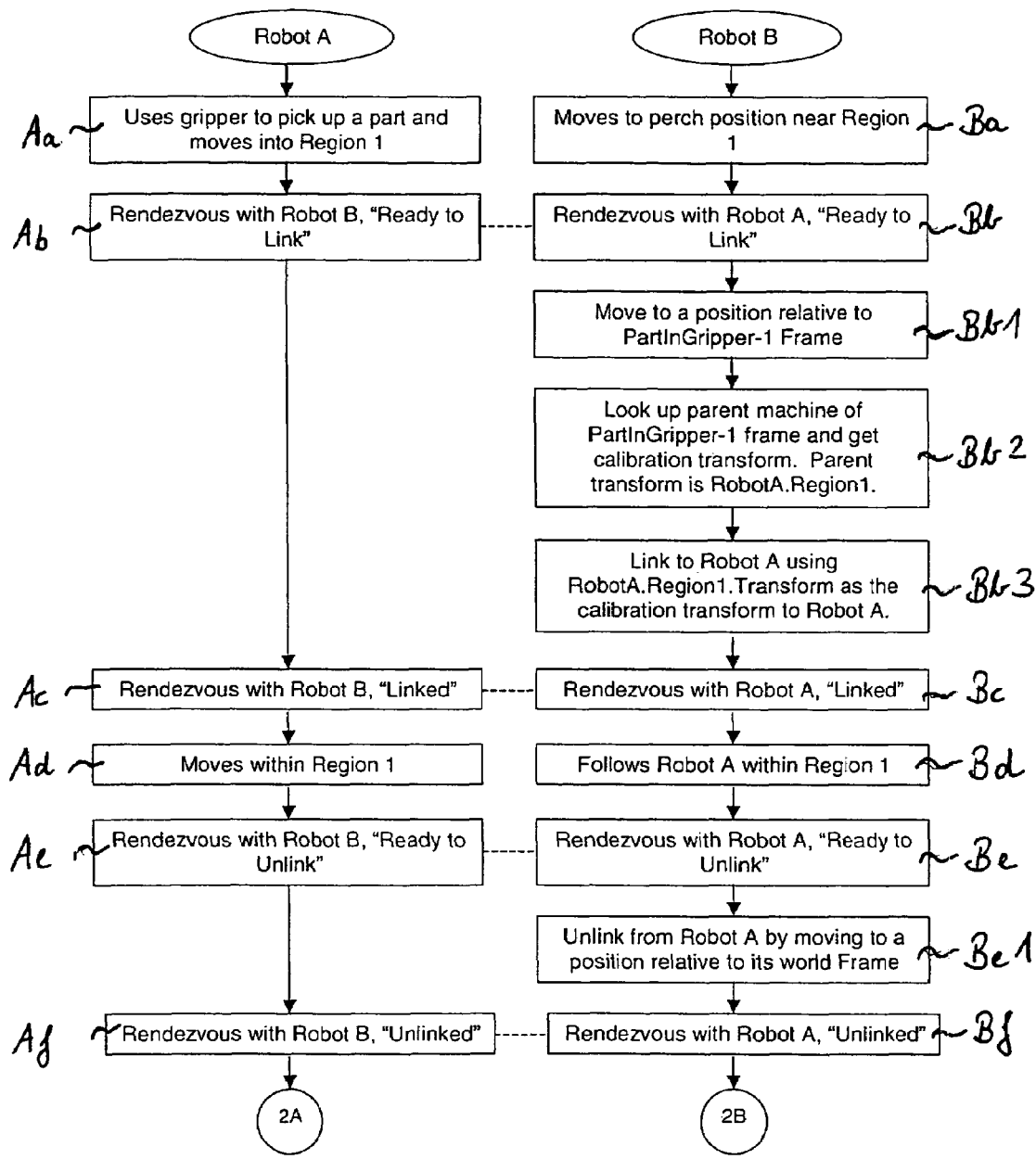
FIG. 6a to 6c shows flow diagrams of the movement of the robots when gripping and transferring an object.

First robot a picks up a part and moves it moves into region 1 (step A of FIG. 6a), whereas robot B moves to a perch position near Robot A (step Ba). The programs on Robot A and Robot B rendezvous, "Ready to Link" (Ab, Bb). This means that A sends an message to B that it is ready to link Robot A then waits for a message from B that it is ready to link. Robot B asynchronously sends a message to A that it is ready to link. Then, both programs proceed. Rendezvous is accomplished using a program synchronization, e.g. the features as described in the co-pending patent application "Method and Apparatus for the synchronous control of manipulators" to Stefan Graf, Andreas Hagenauer, Michael Chaffee and Kenneth Stoddard filed on May 14, 2003.

Figure 6B:
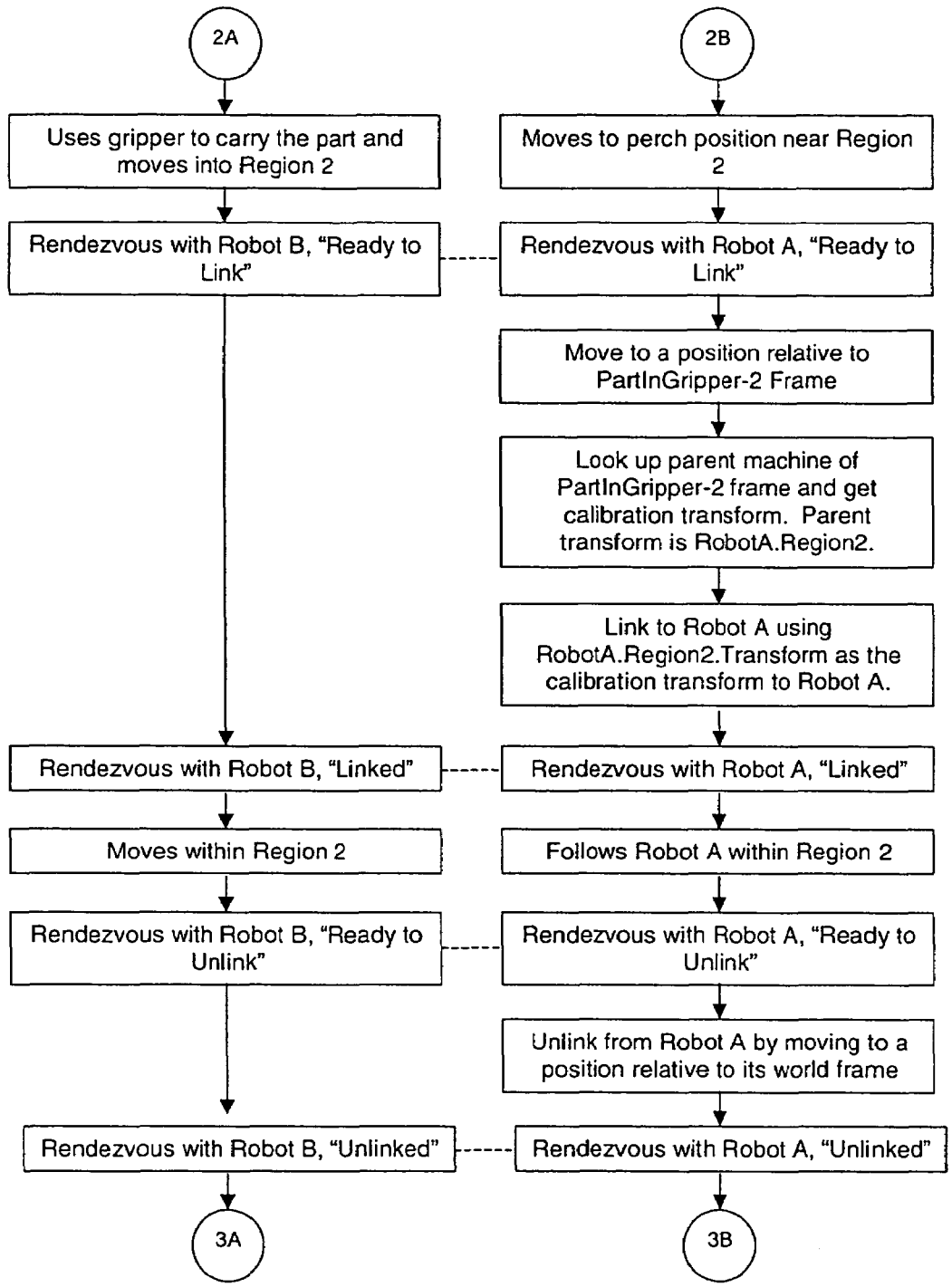
Figure 6C:
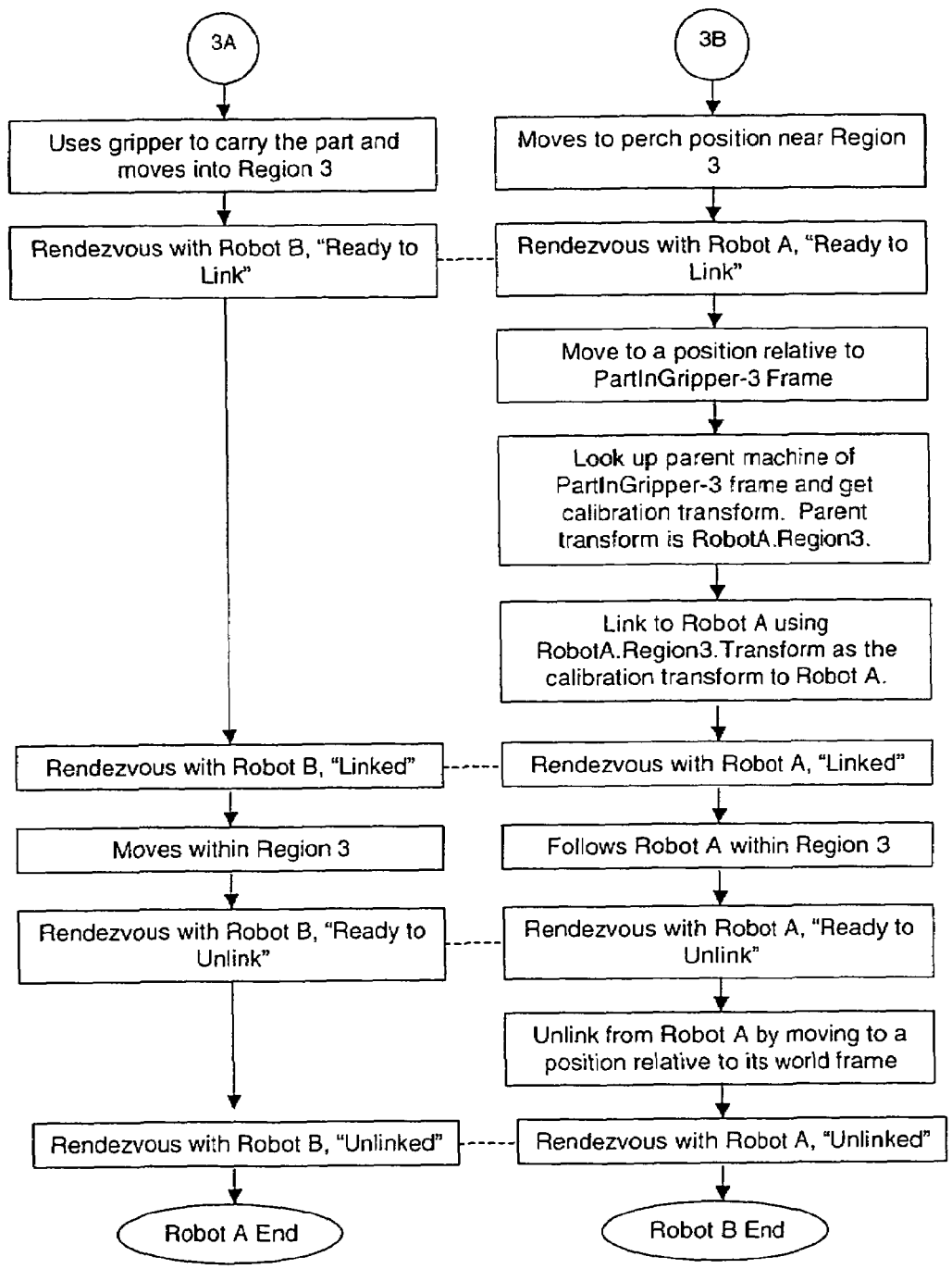

Robot B moves to a programmed position relative to PartInGripper-1 frame. For this motion, the controller must determine what PartIn-Gripper-1 frame is relative to (Bb1). During setup, this frame was assigned to be relative to robot A.region1. This causes B to link to A (Bb3), crating a dependency on robot A as described in the coopending U.S. patent application Ser. No. 10/406,521 of Apr. 3, 2003 "Method and Control System for controlling a Plurality of Robots" to Kenneth A. Stoddard et. al. The actually linking process involves communications between the robots. The programs on both rendezvous when "linked" (Ac, Bc). Robot A moves within Region 1. Robot B follows (Ad, Bd). The programs on both rendezvous to signify they are ready to unlink (Ae, Be). Robot B moves to a position ultimately relative to its own world frame (Be1). The link is broken by this motion command as described in the above mentioned application Ser. No. 10/406,521 a Robot B is no longer dependent on robot A (Af, Bf). The programs on both robot rendezvous when unlinked. The program continues in exactly the same fashion for the two other regions, except the calibration for each region is based on the PartInGripper frame used. PartInGripper-2 frame is relative to a robot A in region 2, so the calibration data RobotA.Region2.Transform is used when a link is performed in region 2—likewise for region 3. This is given in flow diagrampats FIG. 6*b* and FIG. 6*c*.

The whole scenario can be repeated with robot B as the independent robot and robot A dependent on robot B in swapping of roles of independent and dependent robots. In this case the calibration data used would be RobotB.Region-.Transform.

Since a load can cause different amounts of deflection based on the position of the robot, calibration can to do this, the calibration procedure must be performed with the load in place. This way the deflection occurs and the calibration includes the deflection.

What is claimed is:

1. Method for controlling a first robot (1) and at least one other robot (2), the at least one other robot (2) being calibrated relative to the first robot by the determination of at least one coordinate transformation (SF1-2) of the first robot relative to at least one other robot and said at least one transformation (SF1-2) is stored in a control device (2.1) of the other robot, wherein also the first robot (1) is calibrated relative to the other robot (2) by the determination of at least one independent coordinate transformation (SF2-1) and said at least one independent transformation (SF2-1) is stored in a control device of the first robot.

2. Method according to claim 1, wherein in the case of at least three robots, each robot is calibrated relative to the others by at least one independent determination of coordinate transformations and the at least one transformation of the calibration of each robot is stored in a control device thereof.

3. Method according to claim 1, wherein for each robot several calibrations are performed each at different positions and the thus obtained transformations (SF2-1, SF1-2) are stored.

4. Method according to claim 3, wherein in operating in an area dependent manner, the coordinates of one robot and the coordinates of one or other robots transformed thereto are used.

5. Method according to claim 1, wherein the calibrations for each robot (1, 2) are performed at different positions.

6. Method according to claim 1, wherein in the case of cooperative operation of at least two robots (1, 2), the coordinates of the independent robot (1, 2) and the coordinates transformed relative thereto (on the basis of SF2-1 or SF1-2) of the independent robot or robots (2, 1) are used.

7. Method according to claim 1, wherein in the cooperative operation of at least two robots (1, 2) as desired, one (1, 2) of the robots is used as the independent robot and the at least one other robot (2, 1) as a dependent robot.

8. Method according to claim 7, wherein during an operating process the characteristic of the robots (1, 2) as an independent or dependent robot is changed.

9. System for controlling a first robot (1) and at least one other robot (2) with at least one control means (1.1, 2.1) with a device (2.2) for calibrating at least one other robot (2) relative to the first robot (1) by determining at least one coordinate transformation (SF1-2) of the first robot (10 relative to the other robot (2) and with a memory means (2.3) in the control device (2.1) of the other robot (2) for storing said at least one transformation (SF1-2), having determination means (1.2) for calibrating the first robot (1) relative to the other robot (2) by determining at least one independent coordinate transformation (SF2-1) of at least one other robot (2) relative to the first robot (1) and by a memory means (1.3) in a control device (1.1) of the first robot (1) for storing at least one independent transformation (SF2-1).

10. System according to claim 9, with at least three robots, wherein each of the robots (1, 2) in its control device (1.1, 1.2) has a means for its calibration (1.2, 1.2) relative to each of the other robots (2, 1) by determining at least one coordinate transformation (SF2-1, SF1-2) relative to each of the other robots (2, 1), as well as a memory means (1.3, 2.3) for storing the in each case at least one coordinate transformation (SF2-1, SF1-2).

11. System according to claim 9 designed for calibrating each robot (1, 2) by several transformations and for the storage of several such transformations.

12. System according to one of the claims 9 to 11, designed for calibrating the robots (1, 2) at different locations.

13. System according to claim 9, characterized by the use of the coordinates of an independent robot and the transformed coordinates of the at least one dependent robot during cooperative operation of at least two robots.

14. System according to claim 9, designed for using the coordinates of one robot and the coordinates of the other robot or robots transformed relative thereto in different areas of operation.

15. System according to claim 9, wherein one robot is selected as an independent robot and the at least one other robot as a dependent robot during cooperative operation of at the least two robots.

16. System according to claim 15, wherein a characteristic of the robots as independent or dependent robots is changeable during an operating process.

17. A system for controlling plural robots for cooperative function, the system comprising:
a first robot with an associated first robot memory and first robot control device;
a second robot with an associated second robot memory and second robot control device;

a device connected to the second robot for calibrating the second robot relative to the first robot by using measured second robot position coordinates to determine at least one first to second coordinate transformation of the known first robot position relative to the measured second robot position coordinates with the first to second coordinate transformation being stored in said second robot memory;

a device connected to the first robot for calibrating the first robot relative to the second robot by using measured first robot position coordinates to determine at least one second to first coordinate transformation of the measured second robot position relative to the known first robot position coordinates with the second to first coordinate transformation being stored in said first robot memory.

18. A system according to claim 17, wherein for each of the first robot and the second robot, the position of the other robot at calibration is known based on the each robot being at a known location including touching another object or touching the other robot wherein the first and second robots are used in cooperative operation with one an independent robot and the other a dependent robot with spatial dependency wherein the dependent robot's operation is directly dependent on the position of the independent robot and the coordinates of the independent robot are used and the transformed coordinates of the dependent robot are used relative to the independent robot on the basis of the second to first coordinate transformation or first to second coordinate transformation.

19. A system according to claim 18, further comprising:
a third robot with an associated third robot memory and a third robot control device;
a device connected to the third robot for calibrating the third robot relative to the first and second robots by using measured third robot position coordinates to determine first and second to third coordinate transformations of the known first and second robot position relative to the measured third robot position coordinates with the first and second to third coordinate transformations being stored in said third robot memory, wherein said first robot memory stores a third to first coordinate transformation and the second robot memory stores a third to second coordinate transformation.

20. A system according to claim 18 wherein several transformations are established between said first robot and said second robot including transformations based on calibrating the first and second robots at different locations.

* * * * *